United States Patent [19]

Bahiman

[11] 4,215,590
[45] Aug. 5, 1980

[54] BELT FOR TRANSMITTING POWER FROM A COGGED DRIVING MEMBER TO A COGGED DRIVEN MEMBER

[75] Inventor: Hossein Bahiman, Landover Hills, Md.

[73] Assignee: The United States of America as represented by the Administrator of the National Aeronautics and Space Administration, Washington, D.C.

[21] Appl. No.: 943,086

[22] Filed: Sep. 18, 1978

[51] Int. Cl.$^2$ .................. F16G 1/12; F16G 5/10
[52] U.S. Cl. .................. 474/205; 198/847; 198/848
[58] Field of Search .......... 74/231 M, 237, 239, 74/245 S, 250 R, 250 S, 250 C; 198/847, 848, 849

[56] References Cited

U.S. PATENT DOCUMENTS

| 198,860 | 1/1878 | Starck | 74/237 |
|---|---|---|---|
| 277,678 | 5/1883 | Campbell | 74/237 |
| 2,114,181 | 4/1938 | Guba | 198/849 |
| 3,016,756 | 1/1962 | Jackel | 74/237 X |
| 3,276,570 | 10/1966 | Hale et al. | 198/848 |
| 3,961,540 | 6/1976 | Harvey | 74/231 M X |
| 3,973,670 | 8/1976 | Spaar | 74/231 R |

FOREIGN PATENT DOCUMENTS 444028 2/1968 Switzerland ................ 198/848

Primary Examiner—Leslie Braun
Assistant Examiner—Conrad Berman
Attorney, Agent, or Firm—Robert D. Marchant; John R. Manning; John O. Tresansky

[57] ABSTRACT

A belt for transmitting power from a cogged driving member to a cogged driven member such as a pair of wheel sprockets. The belt has inflexible teeth spaced along the direction of its travel. Each of the teeth have a longitudinal axis transverse to the direction of belt travel. The belt also includes substantially inextensible fasts spaced transversely to the direction of belt travel. The fasts extend in the direction of belt travel adjacent to the teeth and are looped around preselected numbers of the teeth.

11 Claims, 4 Drawing Figures

BELT FOR TRANSMITTING POWER FROM A COGGED DRIVING MEMBER TO A COGGED DRIVEN MEMBER

ORIGIN OF THE INVENTION

The invention described herein was made by an employee of the United States Government and may be manufactured and used by or for the Government for governmental purposes without payment of any royalties thereon or therefor.

BRIEF SUMMARY OF THE INVENTION

This invention relates generally to power transmission devices and more particularly to belts for transmitting power from a cogged driving member to a cogged driven member.

Power transmitting belts are known and used in industry at an ever increasing rate. These belts are often subjected to many types of environmental and operational hazards such as extreme cold or heat, radiation degradation, longitudinal stretching, fatigue from constant change of curvature, and wear due to parts engaging the driving and driven members. Any one or combination of these hazards tend to wear and deform the belts so that they may prematurely become useless thereby requiring frequent replacement. In many situations it is virtually impossible to change belts such as those used in spacecraft, permanently encased equipment, equipment used in tunnels and mine shafts, and sealed machines.

There are numerous types of drive belts available which are designed to accomplish a desired purpose. One such belt used in spacecraft is made of polymer fibers to provide tensile strength. The fibers of this belt are coated with plastic and form the teeth without any reinforcement. Due to the constant change in cuvature during operation and being bombarded by solar radiation the belt undergoes fatigue which causes the plastic teeth to crack, deteriorate, and wear so that slippage between the teeth and wheel sprockets occur. In addition, the fibers tend to stretch which causes the tensile stress to substantially subside causing teeth slippage and premature breakage of the belt. Other prior art type belts are made with longitudinal and transverse fibers to give added tensile strength. These fibers are, however, still subject to stretching after continued use and the plastic or matrix formed teeth are subject to wear and deterioration which could cause premature failure of the belt.

Briefly, these and other disadvantages are overcome by providing a power transmitting belt for connecting a cogged driving member to a cogged driven member with a plurality of inflexible teeth spaced along the direction of belt travel. The teeth have a longitudinal axis transverse to the direction of travel of the belt. Substantially inextensible fasts are spaced transversely to the direction of belt travel. These fasts extend in the direction of belt travel adjacent to the teeth and are looped around preselected numbers of the teeth.

Accordingly, one object of the invention is to provide a new and improved belt for transmitting power from a cogged driving rotating member to a cogged driven rotating member.

Another object of the present invention is to provide a drive belt that is substantially immune to failure when subjected to hazardous environmental conditions.

Still another object of the invention is to provide a drive belt that is substantially immune to fatigue and cracking.

A further object of this invention is to provide a drive belt that is substantially immune to stretching in the direction of belt travel.

A still further object of the invention is to provide a drive belt which is substantially immune to slippage around the cogged driving and cogged driven members.

The above and further objects of the invention will appear more fully from the following detailed description when considered in conjunction with the accompanying drawings.

BRIEF DESCRIPTION OF THE DRAWINGS

In the drawings where like parts are designated by the same references.

DESCRIPTION OF THE PREFERRED EMBODIMENT

Figure 1:
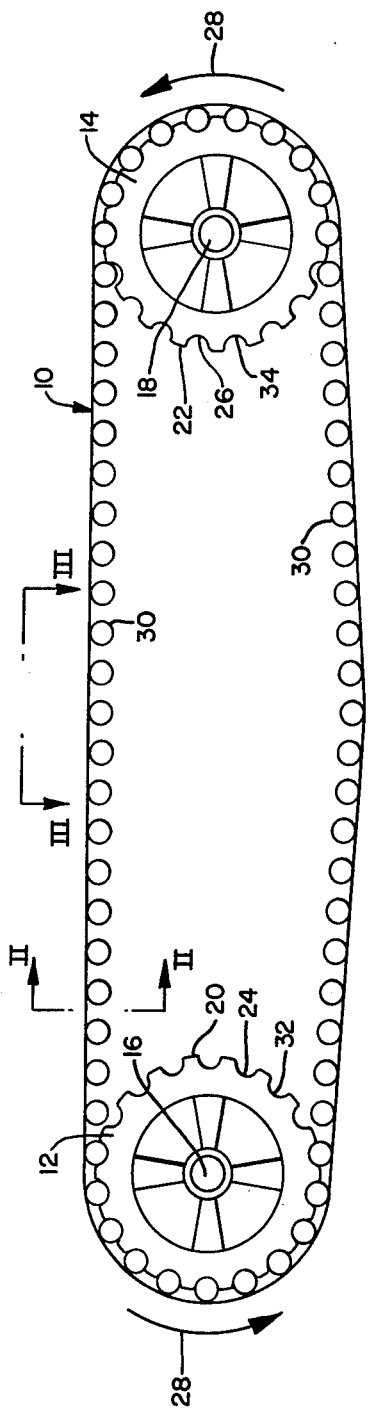
FIG. 1 is a side view of the belt for transmitting power from a cogged driving member to a cogged driven member.

FIG. 1 illustrates a belt, generally designated by numeral 10, for transmitting power from a cogged driving member 12 to a cogged driven member 14. Members 12 and 14 may be wheels fixedly mounted on shafts 16 and 18, respectively. Shaft 16 may be connected to a power source (not shown) for rotating driving wheel 12 while shaft 18 may be connected to any type of machinery (not shown) which is to be turned. Each of wheels 12 and 14 contain a plurality of cogs or sprockets 20 and 22, respectively, equidistantly spaced around their respective peripheries 24 and 26. Belt 10 is preferably of a continuous construction and extends around wheels 12 and 14 in the direction of belt travel indicated by arrows 28.

Figure 3:
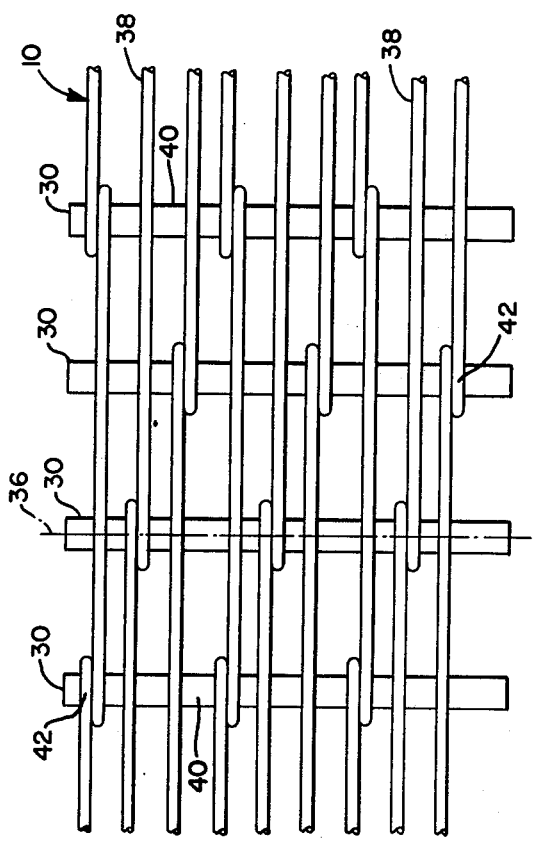
FIG. 3 is a top view of the belt taken along the lines III—III of FIG. 1 showing the relationship between the cylindrical rods and wires, without any incapsulating material.
Figure 2:
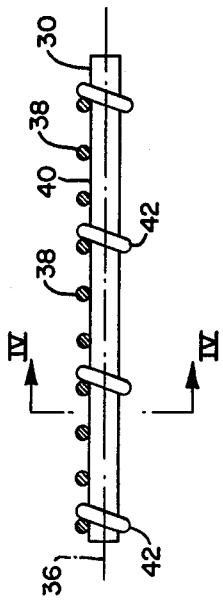
FIG. 2 is a cross sectional view of the belt taken along the lines II—II of FIG. 1 showing the cylindrical rod and the wires adjacent to and looping the rod, without any incapsulating material.

Referring now also to FIGS. 2 and 3, belt 10 includes a plurality of inwardly projecting inflexible teeth 30 which are capable of engaging depressions or spaces 32 and 34 between cogs 20 and 22, respectively, on wheels 12 and 14, respectively. The teeth are preferably cylindrical rods having a longitudinal axis 36 which extends transversely of the direction of travel of belt 10. Each of cylindrical rods 30 is spaced from adjacent cylindrical rods 30 in the direction of belt travel by an amount substantially equivalent to the spacing of adjacent spaces 32 and 34 of wheels 12 and 14 so that as belt 10 travels around wheels 12 and 14 each cylindrical rod 30 engages spaces 32 and 34. Preferably, cylindrical rods 30 extend the width of belt 10. Rods 30 are made from any inflexible material so that they will not be subjected to fatigue forces that are inherent in teeth that continuously flex as they travel around wheels 12 and 14. By substantially eliminating fatigue on rods 30 they will not be subjected to premature wear, cracking, and breakage which would cause rods 30 to slip over cogs 20 and 22. The inflexible material is preferably stainless steel which is substantially immune to degradation by solar and other type radiation and other environmental hazards.

As clearly shown in FIGS. 2 and 3, belt 10 further includes inextensible fasts or connecting elements 38. Each element 38 is spaced from adjacent elements 38 transverse to the direction of belt travel and extends as a continuous entity in the direction of belt travel. Elements 38 serve to tie rods 30 together to form a continuous belt. Elements 38 are made from any inextensible material and of any shape as long as it does not stretch in the direction of belt travel which may result in teeth slippage, but concurrently is sufficiently flexible to withstand the constant flexing around wheels 12 and 14. It has been found that stainless steel wire will meet all of these conditions.

Wires 38 interconnect rods 30 by extending along the top 40 of each of the rods and are looped around preselected ones of the rods as at 42 because if loops 42 are looped around each rod 30, wire 38 between adjacent rods will be inherently curved due to the effects of looping causing belt 10 to stretch longitudinally when the curved portion of the wire straightens under load which may cause teeth slippage. In addition, by looping the wire around preselected rods the number of loops per individual wire is reduced and because each loop is a potential point for cracking and fatigue, a lesser number of loops minimizes the chances of belt failure. It is preferred that adjacent wires 38 be looped around different ones of rods 30 as illustrated in FIGS. 2 and 3 because should an individual wire 38 break it will only effect those rods the wire is looped around. Thus, the majority of rods 30 within belt 10 will not be effected by one wire breaking which will minimize the chances of teeth slippage and possible belt failure. By forming loops 42 around preselected rods 30, the rods are fixedly interconnected and prevented from moving along axis 36 and from shifting position along the direction of belt travel. This construction insures non-slippage of rods 30 which would tend to cause premature failure of belt 10.

As more clearly illustrated in FIG. 3, each wire 38 is looped around every third rod 30 with each adjacent wire 38 being looped on the next succeeding rod. In tying rods 30 together by wires 38 it is preferred that each adjacent wire 38 be an individual wire which ties together each third rod as the wire encircles the periphery of belt 10. It has been found that by looping wire 38 around every third rod 30 the stretching of the wire caused by the inherent wire curve between loops is minimized while at the same time providing adequate support for each rod. To ensure the correct spacing between each consecutive loop 42 of each individual wire 38, each wire is looped around rods 30 in accordance with the relationship $M=K(N+1)$ where M equals the number of rods making up belt 10, N is equal to the number of rods between consecutive loops, and K is any integer. For example, where N is equal to 2 and K is equal to 6, M will be equal to 18.

Although the above configuration is preferred, other arrangements may also be used. Instead of having a plurality of individual wires 38 connecting rods 30, a single wire may be used by winding the single wire around a multiplicity of teeth around the periphery of belt 10 to form a plurality of adjacent wires 38. To ensure the correct spacing of each loop 42 when using this configuration, the wire 38 is looped around rods 30 in accordance with the relationship $M=K(N+1)+1$ or $M=K(N+1)-1$ where M, K, and N are the same as previously described. For example, in the relationship $M=K(N+1)+1$, if N is equal to 2 and K is equal to 6 then M is equal to 19 and in the relationship $M=K(N+1)-1$, if N is equal to 2 and K is equal to 6 then M is equal to 17.

Figure 4:
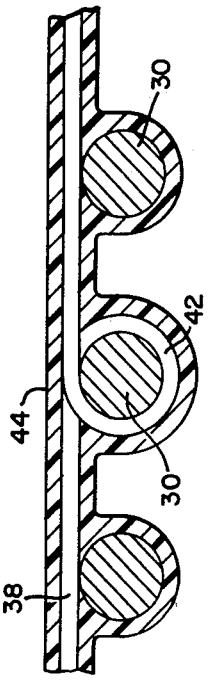
FIG. 4 is a cross-sectional view of the belt taken along the lines IV—IV of FIG. 2 showing the encapsulating flexible material.

As shown in FIG. 4, wires 38 and rods 30 may be encapsulated in a flexible material 44 to reduce any wear that may be caused by rods 30 contacting wheels 12 and 14 and to reduce any noise generated by metal to metal contact. It is preferred that material 44 be made from a flexible substance such as rubber or plastic.

Obvious modifications and variations of the disclosed embodiment of the invention are possible in light of the above teachings. It is to be understood, therefore, that within the scope of the appended claims, the invention may be practiced otherwise than an specifically disclosed.

Accordingly, the invention having been described in its best embodiment that which is desired to be claimed by Letters Patent is:

1. A belt for transmitting power from a cogged driving member to a cogged driven member, comprising;
   a plurality of inflexible teeth means spaced along the direction of travel of said belt, said teeth means having a longitudinal axis transverse to said direction of belt travel; and
   a plurality of substantially inextensible fast means spaced transversely to said direction of belt travel and extending in said direction of belt travel adjacent to said teeth means, each of said fast means being looped around selective teeth means, at least one unlooped teeth means being interposed between adjacent looped teeth means, and each fast means being looped around teeth means different from adjacent fast means, whereby said belt is substantially immune from longitudinal stretching, tooth slippage, fatigue, cracking, and premature failure.

2. The belt of claim 1 wherein each of said teeth means is a cylindrical metal rod.

3. The belt of claim 2 where in each of said cylindrical metal rods is stainless steel.

4. The belt of claim 1 wherein said fast means is a plurality of spaced metal wires.

5. The belt of claims 4 wherein said metal wire is stainless steel.

6. The belt of claim 1 wherein each of said fast means is looped around said selective teeth means in accordance with the relationships $M=K(N+1)$ wherein M is the number of said teeth means in said belt, N is the number of said teeth means between consecutive loops and K is an integer.

7. The belt of claim 1 wherein each of said fast means is looped around said selective teeth means in accordance with the relationship $M=K(N+1)+1$ wherein M is the number of said teeth means in said belt, N is the number of said teeth means between consecutive loops, and K is an integer.

8. The belt of claim 1 wherein each of said fast means is looped around said selective teeth means in accordance with the relationship $M=K(N+1)-1$ wherein M is the number of said teeth means in said belt, N is the number of said teeth means between consecutive loops, and K is an integer.

9. The belt of claim 1 further including flexible means encapsulating all of said teeth means and said fast means.

10. The belt of claim 9 wherein said flexible means is rubber.

11. The belt of claim 9 wherein said flexible means is plastic.

* * * * *